(12) United States Patent
Nomoto

(10) Patent No.: US 11,521,613 B2
(45) Date of Patent: Dec. 6, 2022

(54) COMMUNICATION SYSTEM, CONTROL METHOD, AND NON-TRANSITORY COMPUTER-READABLE STORAGE MEDIUM

(71) Applicant: CANON KABUSHIKI KAISHA, Tokyo (JP)

(72) Inventor: Masakazu Nomoto, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 215 days.

(21) Appl. No.: 16/918,890

(22) Filed: Jul. 1, 2020

(65) Prior Publication Data

US 2021/0005196 A1 Jan. 7, 2021

(30) Foreign Application Priority Data

Jul. 3, 2019 (JP) .............................. JP2019-124619

(51) Int. Cl.

| | |
|---|---|
| *G10L 15/22* | (2006.01) |
| *G10L 15/08* | (2006.01) |
| *G10L 15/30* | (2013.01) |
| *H04W 4/10* | (2009.01) |
| *H04L 29/06* | (2006.01) |
| *H04L 12/58* | (2006.01) |
| *H04M 3/537* | (2006.01) |

(Continued)

(52) U.S. Cl.
CPC .............. *G10L 15/22* (2013.01); *G10L 15/08* (2013.01); *G10L 15/30* (2013.01); *H04L 51/224* (2022.05); *H04L 63/10* (2013.01); *H04M 3/537* (2013.01); *H04W 4/10* (2013.01); *G10L 2015/223* (2013.01)

(58) Field of Classification Search
CPC ....... G06F 21/608; G10L 15/08; G10L 15/22; G10L 15/30; G10L 2015/223; H04L 51/24; H04L 63/0861; H04L 63/10; H04L 63/102; H04L 67/34; H04M 3/537; H04W 4/10
USPC ................. 455/418, 420, 424, 425, 411, 500
See application file for complete search history.

(56) References Cited

U.S. PATENT DOCUMENTS

| | | | | |
|---|---|---|---|---|
| 6,393,421 | B1 * | 5/2002 | Paglin | H04L 29/12009 707/999.009 |
| 9,112,701 | B2 * | 8/2015 | Sano | H04W 12/33 |
| 9,578,585 | B2 * | 2/2017 | Brooksby | H04W 4/16 |

(Continued)

FOREIGN PATENT DOCUMENTS

JP        2019-046102 A        3/2019

*Primary Examiner* — Tan H Trinh
(74) *Attorney, Agent, or Firm* — Canon U.S.A., Inc. IP Division

(57) ABSTRACT

A communication system comprises a communication device and a server system. The communication system obtains permission to perform a function related to the communication device from a user, performs a predetermined process of obtaining permission to perform a predetermined function from the user, if the predetermined function that the user does not permit the server system to perform is added as the function, performs the function that the user permits the server system to perform in advance, if an instruction for performing the function that the user permits the server system to perform in advance is inputted into a voice control device with a voice, after the predetermined process is performed and in a state where the permission to perform the predetermined function is not obtained from the user, and performs a process corresponding to the function.

17 Claims, 14 Drawing Sheets

(51) Int. Cl.
*H04L 9/40* (2022.01)
*H04L 51/224* (2022.01)

(56) References Cited

U.S. PATENT DOCUMENTS

| | | | |
|---|---|---|---|
| 9,678,733 B2* | 6/2017 | Ueda | G06F 8/61 |
| 2012/0042362 A1* | 2/2012 | Vlasov | G06F 21/604 |
| | | | 726/4 |
| 2013/0239179 A1* | 9/2013 | Matsumura | H04N 1/4433 |
| | | | 726/4 |
| 2015/0121470 A1* | 4/2015 | Rongo | H04W 4/80 |
| | | | 726/4 |
| 2015/0134343 A1* | 5/2015 | Kluger | H04L 51/24 |
| | | | 705/2 |
| 2017/0052661 A1* | 2/2017 | Thelin | H04L 67/06 |
| 2019/0068810 A1* | 2/2019 | Okamoto | G06F 3/167 |
| 2019/0184919 A1* | 6/2019 | Kamini | B60H 1/00985 |
| 2019/0384562 A1* | 12/2019 | Jannace | H04L 63/102 |
| 2020/0304684 A1* | 9/2020 | Abe | G06F 3/04845 |

* cited by examiner

FIG. 13

| MESSAGE ID | GUIDE MESSAGE |
|---|---|
| R1 | An application will be updated on February 15. Please request a printer administrator to adjust settings to use a new function. |
| R2 | An application has been updated. Please request a printer administrator to adjust settings to use a new function. |
| R3 | Usable functions will be increased on February 15. Please link the account again after February 15 to use a new function. |
| R4 | You can now maintain the printer by using a voice command. Please link the account again to use a new function. |
| R5 | An application has been updated. Please link the account again to use a new function. |

COMMUNICATION SYSTEM, CONTROL METHOD, AND NON-TRANSITORY COMPUTER-READABLE STORAGE MEDIUM

BACKGROUND

Field

The present disclosure relates to a communication system, a control method, and a non-transitory computer-readable storage medium.

Description of the Related Art

A communication system includes an information-processing apparatus such as a server, and when an instruction for performing a function relative to a communication device such as a printer is inputted with a voice into a voice control device such as a smart speaker, the information-processing apparatus performs a function relative to the instruction (Japanese Patent Laid-Open No. 2019-046102).

To perform the function relative to the communication device by the information-processing apparatus, it is necessary to obtain permission to perform the function from a user in advance. Even in some cases where permission to perform some of functions has been already obtained, a new function that the user has not permitted to perform is added as a function relative to the communication device. As above mentioned communication systems becomes more common, there is an increasing need to appropriately perform a process in the case where a new function that the user has not permitted to perform is added as a function relative to a communication device.

SUMMARY

According to the present disclosure, a process in the case where a new function that a user has not permitted to perform is added as a function related to a communication device is appropriately performed.

One aspect of the present disclosure provides a communication system including a communication device and a server system, the communication system comprising: an obtaining unit that obtains permission to perform a function related to the communication device using the server system from a user. A first performing unit is provided that performs a predetermined process of obtaining permission to perform a predetermined function using the server system from the user, in a case where the predetermined function that the user does not permit the server system to perform is added as the function related to the communication device. A second performing unit is provided that performs the function related to the communication device that the user permits the server system to perform in advance, in a case where an instruction for performing the function related to the communication device that the user permits the server system to perform in advance is inputted into a voice control device with a voice, after the predetermined process is performed and in a state where the permission to perform the predetermined function by using the server system is not obtained from the user. A third performing unit is provided that performs a process corresponding to the function related to the communication device by the communication device.

Further features will become apparent from the following description of exemplary embodiments with reference to the attached drawings.

BRIEF DESCRIPTION OF THE DRAWINGS

FIG. 13 illustrates a table in which the contents of the guide message are illustrated.

DESCRIPTION OF THE EMBODIMENTS

Figure 1:
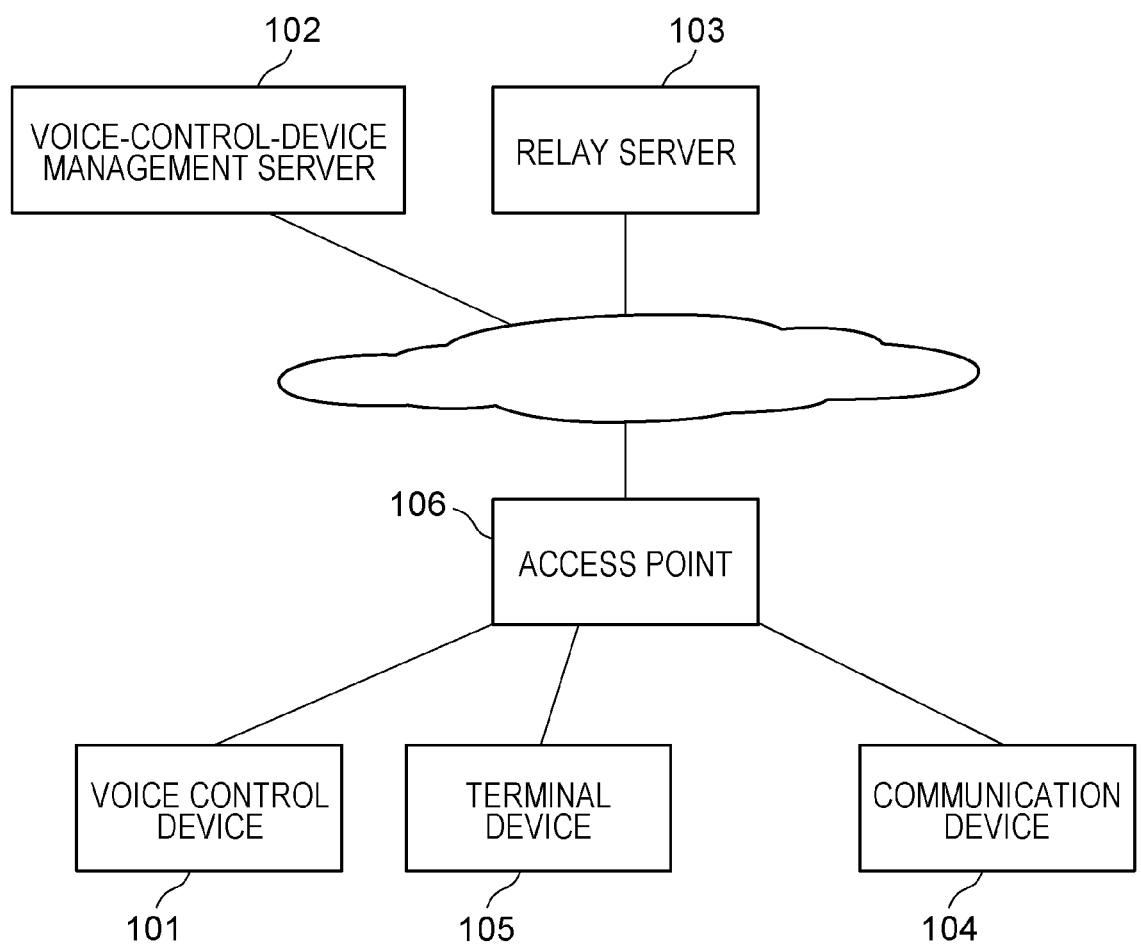
FIG. 1 illustrates the structure of a communication system.

Hereinafter, embodiments will be described in detail with reference to the drawings. Note, the following embodiments are not intended to limit the scope of the claimed disclosure. Multiple features are described in the embodiments, but limitation is not made to the disclosure that requires all such features, and multiple such features may be combined as appropriate. Furthermore, in the attached drawings, the same reference numerals are given to the same or similar configurations, and redundant description thereof is omitted.

First Embodiment

System Configuration

FIG. 1 illustrates an example of the structure of a communication system according to the present embodiment. The system according to the present embodiment includes, for example, a voice control device 101, a voice-control-device management server (referred to below as a management server) 102, a relay server 103, a communication device 104, a terminal device 105, and an access point (AP) 106. An example of the voice control device 101 is a smart speaker. Examples of the terminal device 105 include any terminal devices such as a smart phone, a PC (Personal Computer), a tablet terminal, a cellular phone, and a PDA (Personal Digital Assistant). In the following description, the terminal device 105 is a smart phone. The communication device 104 corresponds to a communication device according to the present embodiment and is a printer that forms (prints) an image on a recording medium by applying a recording material such as ink on the recording medium such as paper. The communication device 104 may be a multifunction peripheral that has functions such as a copy function, a FAX function, and a print function. According to the present embodiment, the communication device 104 is an ink-jet printing device but is not limited thereto. For example, the communication device 104 may be an electrophotographic or thermal sublimation printing device. The communication device 104 is described as an example of the communication device according to the present embodiment, but this is not a limitation. For example, the communication device 104 may be a device that can provide a service other than printing such as a copying machine, a facsimile machine, a smart phone, a cellular phone, a tablet terminal, a PDA, a digital camera, a music playback device, a storage, a projector, or a PC. An example of the AP 106 is a wireless LAN router. A device that is connected to the AP 106 can use the internet via the AP 106. According to the present embodiment, the voice control device 101, the communication device 104, and the terminal device 105 are wirelessly connected to the AP 106 in accordance with a wireless communication method of a wireless LAN conforming IEEE 802.11 standard series.

The voice control device 101 and the terminal device 105 can communicate with the management server 102 via the AP 106 and the internet. The communication device 104 can communicate with the relay server 103 via the AP 106 and the internet. The voice control device 101 and the terminal device 105 can be connected to (communicate with) each other via the AP 106. In the system illustrated in FIG. 1, the voice control device 101, the communication device 104, and the terminal device 105 are connected to the same AP and can use the internet but are not limited thereto. For example, the voice control device 101, the communication device 104, and the terminal device 105 may be connected to different APs to use the internet. The AP may not be used. For example, a LTE or 4G mobile communication network may be used to use the internet.

According to the present embodiment, the management server 102 is provided by a vendor of the voice control device 101 and manages a process that is performed by using a voice instruction to the voice control device 101. The relay server 103 is provided by a vendor of the communication device 104 and manages a process that the communication device 104 is instructed to perform via the internet. According to the present embodiment, the relay server 103 provides a function (that is, a print service) that uses the communication device 104 that is capable of printing. The print service is not limited to a function of causing the communication device 104 to perform printing but can include another function such as a function of causing the communication device 104 to perform a scan process.

According to the present embodiment, the management server 102 and the relay server 103 are respective servers (information-processing apparatuses such as PCs) but are not limited thereto. Servers that operate in corporation with each other may function as the management server 102 and the relay server 103. That is, server systems such as the management server 102 and the relay server 103 may each include one or more servers.

Figure 2:
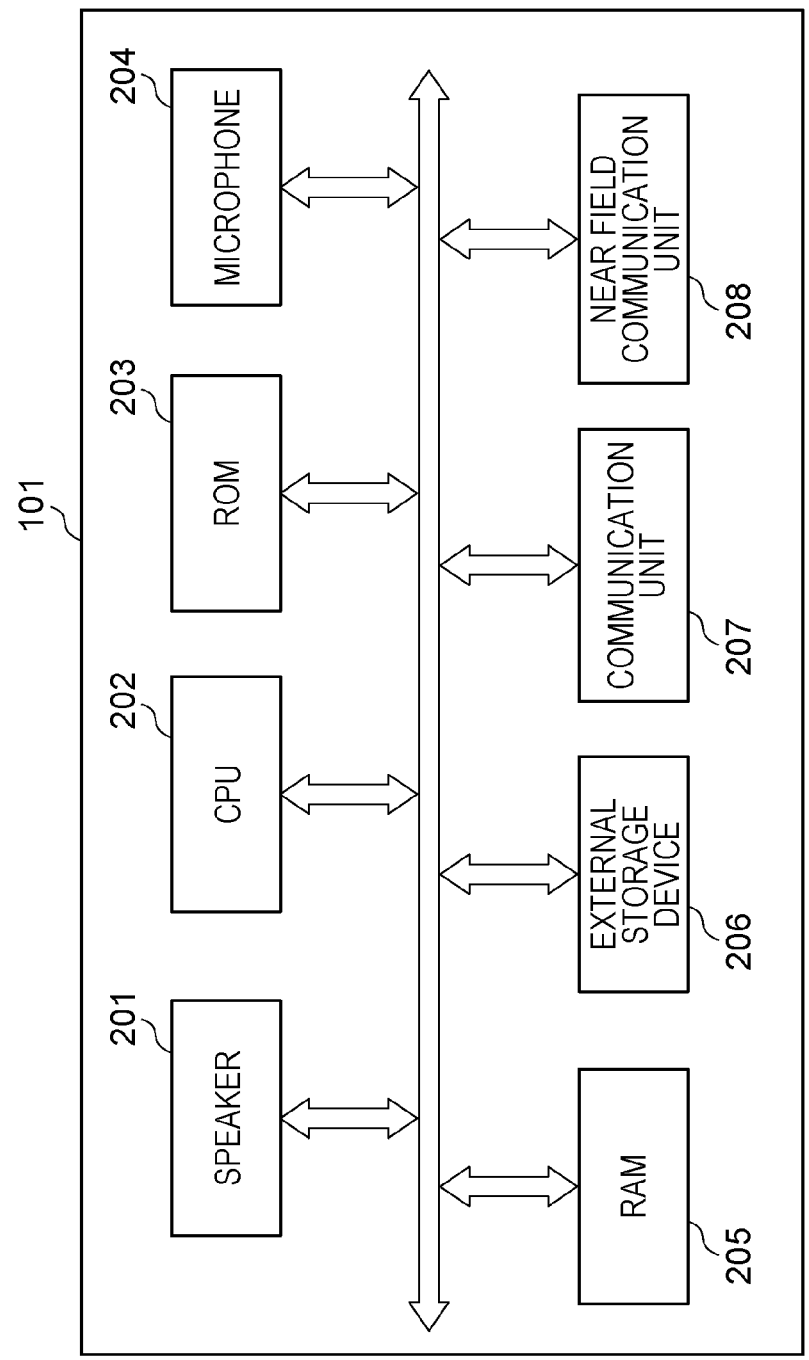
FIG. 2 is a block diagram schematically illustrating the hardware configuration of a voice control device.
Figure 3:
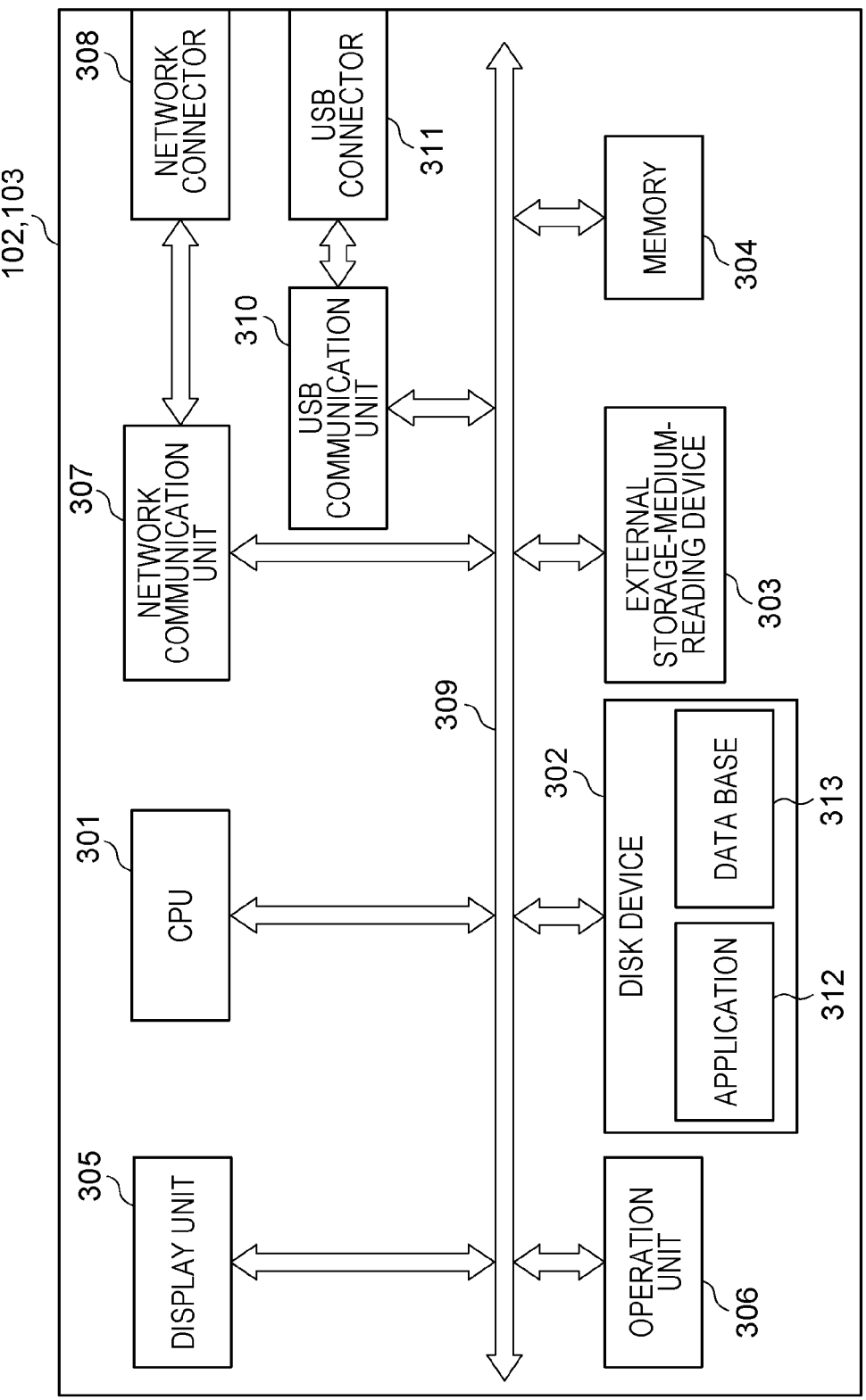
FIG. 3 is a block diagram schematically illustrating the hardware configuration of servers.
Figure 4:
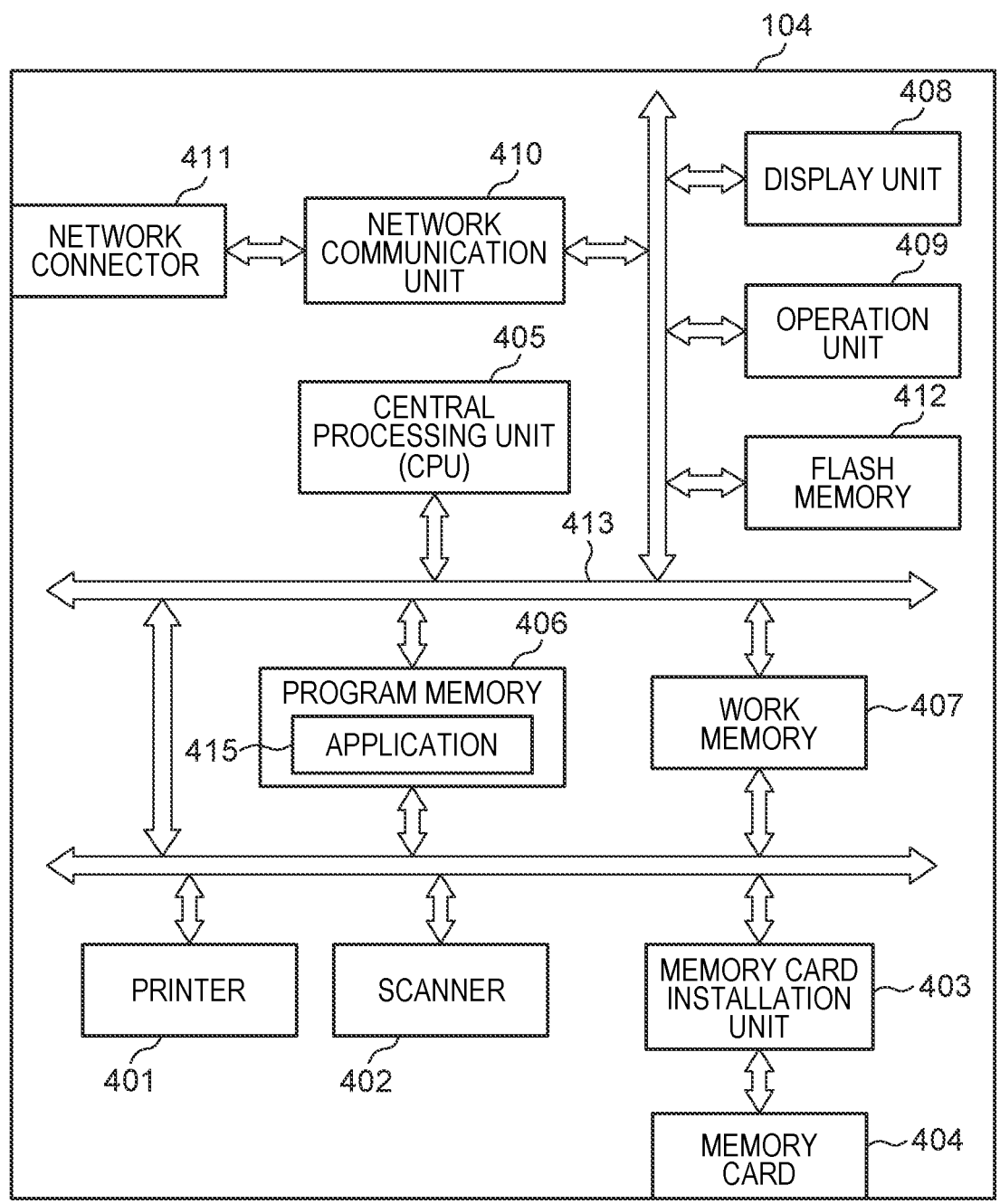
FIG. 4 is a block diagram schematically illustrating the hardware configuration of a communication device.

FIG. 2 is a block diagram schematically illustrating the hardware configuration of the voice control device 101. The voice control device 101 includes a speaker 201, a CPU 202, a ROM 203, a microphone 204, a RAM 205, an external storage device 206, a communication unit 207, and a near field communication unit 208. Blocks illustrated in FIG. 2 to FIG. 4 are connected to each other by using, for example, an internal bus. The CPU is the initials of a Central Processing Unit. The ROM is the initials of a Read Only Memory. The RAM is the initials of a Random Access Memory. These configurations are examples. The devices may include another hardware other than the illustrated hardware. The blocks in FIG. 2 to FIG. 4 may be integrated into a block, and a block may be divided into two or more blocks. That is, the devices can have any structure, provided that the devices can perform processes described later.

From the speaker 201, a voice comes out by performing a process described later. The CPU 202 is a system control unit and a processor that controls the entire voice control device 101. The ROM 203 stores fixed data such as a control program that is performed by the CPU 202, a data table, and an embedded OS (Operating System) program. According to the present embodiment, the control program that is stored in the ROM 203 is used for software execution control such as scheduling, task switching, or interrupt processing under management of the embedded OS that is stored in the ROM 203. The microphone 204 receives a voice around the voice control device. For example, a voice that comes out from a user is received. The RAM 205 includes, for example, a SRAM (Static RAM) that needs a backup power supply. In the RAM 205, data is held by a primary battery for data backup not illustrated, and data such as a program control variable is not volatilized and can be stored. The RAM 205 has a memory area in which information about settings of the voice control device 101 and management data, for example, are stored. The RAM 205 is also used as a main memory and a work memory of the CPU 202. The external storage device 206 stores application software.

The communication unit 207 includes an antenna and a circuit for communication in accordance with a predetermined wireless communication method. For example, the communication unit 207 can be wirelessly connected to the access point. In some cases, the communication unit 207 operates as an access point that is temporarily used. Wireless communication that is used according to present embodiment can follow a wireless communication method (Wi-Fi) of a wireless LAN conforming IEEE 802.11 standard series or can follow another wireless communication method.

The near field communication unit 208 establishes near field communication with another device that is located within a short distance from the voice control device 101. The near field communication unit 208 communicates in a wireless communication method that differs from that of the communication unit 207. According to the present embodiment, the near field communication unit 208 operates in accordance with the Bluetooth® standard.

Figure 5:
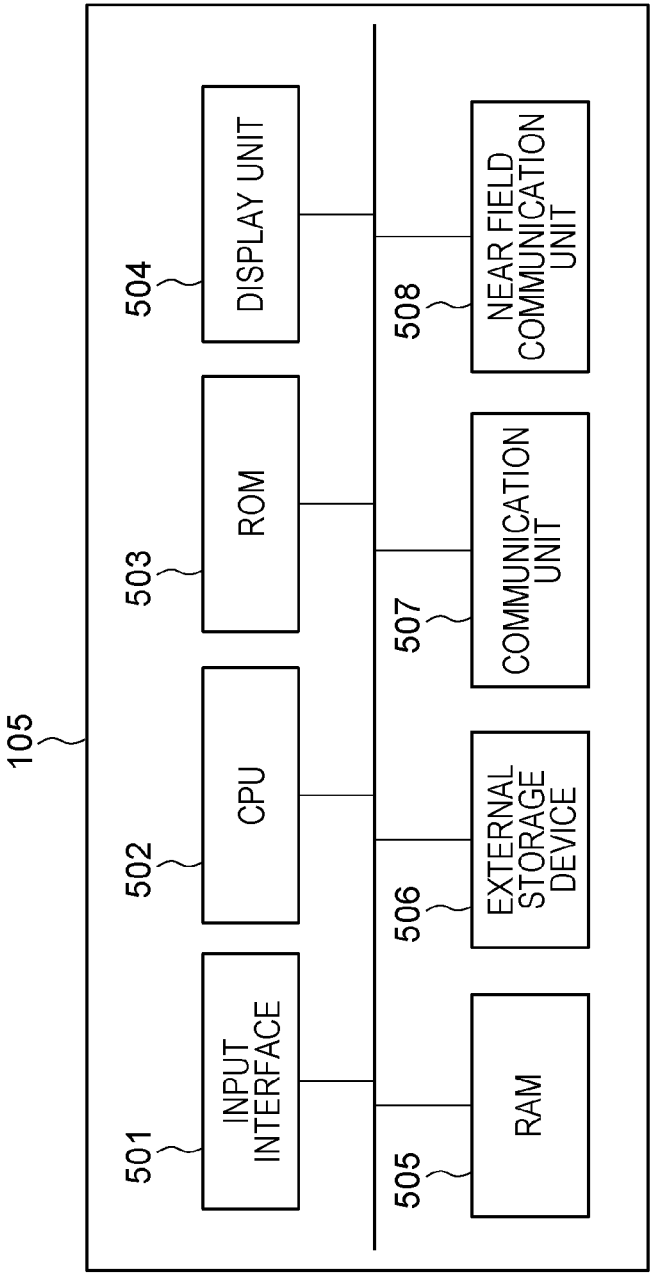
FIG. 5 is a block diagram schematically illustrating the hardware configuration of a terminal device.

FIG. 5 is a block diagram schematically illustrating the hardware configuration of the terminal device 105. The terminal device 105 includes, for example, an input interface 501, a CPU 502, a ROM 503, a display unit 504, a RAM 505, an external storage device 506, a communication unit 507, and a near field communication unit 508. These blocks are connected to each other by using, for example, an internal bus.

The CPU 502 is a system control unit and controls the entire device. The RAM 505 includes, for example, a DRAM (Dynamic RAM) that needs a backup power supply as in the RAM 205. The RAM 505 is also used as a main memory and a work memory of the CPU 502. The ROM 503 stores fixed data such as a control program that is performed by the CPU 502, a data table, and an OS program. According to the present embodiment, an application program (referred to below as a voice control application) for the voice control device 101 is installed in the terminal device 105 and stored in the ROM 503.

The display unit 504 includes, for example, a LED (light-emitting diode) or a LCD (liquid-crystal display) and displays a screen based on various kinds of data. The display unit 504 may include, for example, a touch display and may have a function of receiving various inputs from the user. That is, the display unit 504 may be an interface for receiving a data input or an operation instruction from the user and may be an operation panel that includes, for example, a physical keyboard, a button, or a touch screen. The communication unit 507 has the same function as that of the communication unit 207 and can be wirelessly connected to another device via the AP 106. The near field communication unit 508 is a device that can establish near field communication with the near field communication unit 208 by using the same wireless communication method as that of the near field communication unit 208.

FIG. 3 is a block diagram schematically illustrating the hardware configuration of the management server 102 and the relay server 103. According to the present embodiment, the management server 102 and the relay server 103 are respective servers. However, servers that operate in corporation with each other may provide server systems corresponding to the management server 102 and the relay server 103.

A CPU 301 is a processor that controls components described below. A disk device 302 stores an application program 312, a database 313, an OS, and various files that are read by the CPU 301. An external storage-medium-reading device 303 reads information such as a file that is stored in an external storage medium such as a SD card. A memory 304 includes, for example, a RAM and is used, for example, to temporarily store data or for buffering by the CPU 301 as needed. A display unit 305 includes, for example, a LED (light-emitting diode) or a LCD (liquid-crystal display) and displays a screen based on various kinds of data. An operation unit 306 includes a keyboard and a mouse that are used by the user for various input operations. A network communication unit 307 is connected to a network such as the internet via a network connector 308 for various kinds of communication. The network communication unit 307 communicates by using a wired LAN or a wireless LAN. In the case where the network communication unit 307 supports a wired LAN, the network connector 308 is a connector for connecting a wired LAN cable. In the case where the network communication unit 307 supports a wireless LAN, the network connector 308 is an antenna. The network connector 308 may support both of a wired LAN and a wireless LAN. A USB (Universal Serial Bus) communication unit 310 is connected to various kinds of peripherals via a USB connector 311 for various kinds of communication in accordance with a USB standard. The components described above are connected to each other by using a bus 309. The processes of the management server 102 and the relay server 103 described later are performed in a manner in which the CPU 301 reads and runs programs that are needed for the processes.

FIG. 4 is a block diagram schematically illustrating the hardware configuration of the communication device 104.

In the communication device 104, the print function is performed by a printer 401, a scanner function is performed by a scanner 402, and a storage function is performed by a memory card installation unit 403 and a memory card 404.

The printer 401 performs printing based on image data that is received from the outside or image data that is stored in the memory card 404. The printer 401 manages information about ink, such as the amount of remaining ink and information about paper, such as the amount of remaining paper.

The scanner 402 optically reads a manuscript that is placed on a manuscript stand (not illustrated) for conversion to electronic data and transmits image data that is converted in a designated file format to an external device via the network or stores the image data in a save area (not illustrated) such as an HDD. The copy function is performed in a manner in which image data that is generated by reading a manuscript that is placed on the manuscript stand by the scanner 402 is transferred to the printer 401, and the printer 401 prints an image based on the image data on print paper.

The memory card 404 is installed in the memory card installation unit 403 stores various kinds of file data. In some cases, the file data is read from an external device via the network and edited. The file data can be stored in the memory card 404 from the external device.

The communication device 104 includes a CPU 405, a program memory 406, a work memory 407, a display unit 408, an operation unit 409, a network communication unit 410, a network connector 411, and a flash memory 412. CPU 405 is a processor that controls the components in the communication device 104. The program memory 406 includes, for example, a ROM and stores various kinds of program codes and an application 415 for communication with the relay server 103. The application 415 accesses the printer 401 to obtain the information about the ink and the information about the paper. The work memory 407 includes, for example, a RAM and is used to temporarily store, for example, image data or for buffering during a service. The display unit 408 includes, for example, a LED (light-emitting diode) and a LCD (liquid-crystal display) and displays a screen based on various kinds of data. The operation unit 409 includes, for example, a switch that is used by the user for various input operations. The network communication unit 410 is connected to a network such as an internet via the network connector 411 for various kinds of communication. The network communication unit 410 communicates by using a wired LAN or a wireless LAN. In the case where the network communication unit 410 supports a wired LAN, the network connector 411 is a connector for connecting a wired LAN cable. In the case where the network communication unit 410 supports a wireless LAN, the network connector 411 is an antenna. The network connector 411 may support both a wired LAN and a wireless LAN. According to the present embodiment, the network communication unit 410 supports a wireless LAN and is connected to the AP 106 in accordance with a wireless communication method of a wireless LAN conforming IEEE 802.11 standard series.

The flash memory 412 is a non-volatile memory that stores, for example, image data that is received by the network communication unit 410. The above components are connected to each other by using a bus 413. The process of the communication device 104 described later is performed in a manner that the CPU 405 reads and runs a program that is needed for the process.

Print Process Using Voice Control Device 101

In the system illustrated in FIG. 1, a print process that uses the voice control device 101 is performed. To perform the print process that uses the voice control device 101, it is necessary to perform a registration process for management of the devices that are associated by the management server 102. The registration process will be described with reference to a sequence diagram in FIG. 6. Processes in the sequence are performed by the devices in a manner that the CPUs of the devices run programs that are stored in, for example, the ROMs of the devices. A program that is performed by the terminal device 105 is the voice control application.

The registration process for management of the devices that are associated by the management server 102 will now be described.

Before the registration process is performed, the user logs in to a user account (referred to below as a first account) for the voice control device 101 that is managed by the management server 102 by using the voice control application of the terminal device 105. In response to this, the management server 102 associates the terminal device 105 and the first account with each other for management. Consequently, the management server 102 recognizes information about the voice control application of the terminal device 105 that is associated with the first account. The terminal device 105 recognizes information (such as an account name or ID and a password) about the first account.

Subsequently, at S601, the mode of the voice control device 101 transitions to a mode in which a predetermined operation is received from the user, and a first registration process is performed. Specifically, the voice control device 101 makes its own access point active.

In step S602, the terminal device 105 receives an input into a screen that is displayed by the voice control application, as an instruction for performing the registration process from the user.

In step S603, the terminal device 105 is connected to the access point of the voice control device 101 by using Wi-Fi.

In step S604, the terminal device 105 specifies an external access point to which the voice control device 101 is to be connected. Specifically, the terminal device 105 searches external access points present around and displays a list of the external access points found. The terminal device 105 specifies the external access point that is selected by the user among those in the list. A method of specifying the external access point is not limited thereto. For example, the terminal device 105 may receive a list of external access points that are found by a search by the voice control device 101 from the voice control device 101 through a Wi-Fi connection and may specify the external access point that is selected by the user among those in the list. For example, the terminal device 105 may specify an external access point to which the terminal device 105 is connected when the instruction for performing the registration process is received from the user.

In step S605, the terminal device 105 transmits information about the external access point that is specified at S604 and information about the first account to the voice control device 101 through the Wi-Fi connection. The terminal device 105 may disconnect the Wi-Fi connection with the voice control device 101 after transmitting the information at S605 and may establish a Wi-Fi connection with the external access point specified at S604.

In the above description, the voice control device 101 receives information that is needed for the first registration process by using Wi-Fi but is not limited thereto. For example, the voice control device 101 may make a Bluetooth® function active in a mode in which the first registration process is performed and may receive the information that is needed for the first registration process through a Bluetooth® connection with the terminal device 105.

At S606, the voice control device 101 makes its own access point inactive and disconnects the Wi-Fi connection with the terminal device 105. The voice control device 101 is connected to the external access point by using Wi-Fi, based on the information about the external access point that is received from the terminal device 105. In the case where the voice control device 101 is successfully connected to the external access point by using Wi-Fi, this may be reported by voice notification.

In step S607, the voice control device 101 accesses the management server 102 via the external access point and transmits the information about the first account that is received from the terminal device 105 and the information about its own identification to the management server 102.

In step S608, the management server 102 associates the voice control device 101 and the first account with each other based on the received information for management. The management server 102 has already associated the terminal device 105 and the first account with each other for management. Accordingly, at S608, the voice control device 101, the terminal device 105, and the first account are associated with each other.

In step S609, the terminal device 105 registers a service (skill) that is used by using the voice control device 101. According to the present embodiment, the print service that uses the voice control device 101 is used, and the print service related to the communication device 104 is registered. Accordingly, the terminal device 105 transmits information that represents the user selects the print service related to the communication device 104 to the management server 102. When the skill is registered, the first account and a user account (referred to below as a second account) that is managed by the relay server 103 that is associated with the print service are associated with each other. Accordingly, the following process is referred to as an account link process.

In step S610, the management server 102 associates the print service related to the communication device 104 and the first account with each other based on the received information for management. That is, the print service related to the communication device 104 is registered.

In step S611, the management server 102 transmits, to the terminal device 105, a URL for login to the print service.

In step S612, the terminal device 105 accesses the relay server 103 by using the URL that is received at S611 and requests information about a login screen from the relay server 103. The information about the login screen means information that is used to display the login screen for the login to the second account.

In step S613, the relay server 103 transmits the information about the login screen to the terminal device 105 in response to the request at S612.

Figure 9:
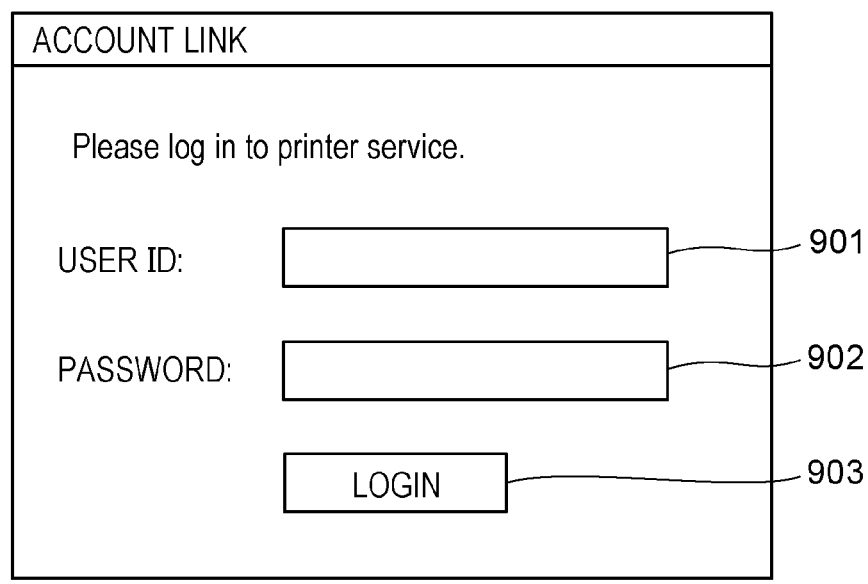
FIG. 9 illustrates an example of a login screen.

In step S614, the terminal device 105 displays the login screen. It is assumed that a PC that controls the communication device 104, for example, logs in to the second account, and the relay server 103 associates the second account and the communication device 104 with each other in advance for management. FIG. 9 illustrates an example of the login screen that is displayed at this time. An area 901 is used to input the ID of the second account. An area 902 is used to input a password for the login to the second account. An area 903 is used for an instruction for the login to the second account.

In step S615, the terminal device 105 receives an operation in the area 903. The terminal device 105 transmits information about the login inputted in the area 901 and the area 902, the information about the first account, and information about the management server 102 to the relay server 103.

In step S616, the relay server 103 determines whether the received information about the login is correct. If the received information about the login is correct, and the login to the second account succeeds, the relay server 103 transmits information about a permission screen to the terminal device 105. The information about the permission screen is obtained via a screen for receiving an input that represents whether permission to perform a function (in other words, a function that can be performed by using the relay server 103) related to the communication device 104 is granted to the management server 102. If the received information about the login is wrong, and the login to the second account fails, the relay server 103 transmits information that represents login failure to the terminal device 105. When the information that represents the login failure is received, the terminal device 105 notifies the user of the login failure and the wrong inputted information about the login and subsequently receives an input of the information about the login again.

Figure 10A:
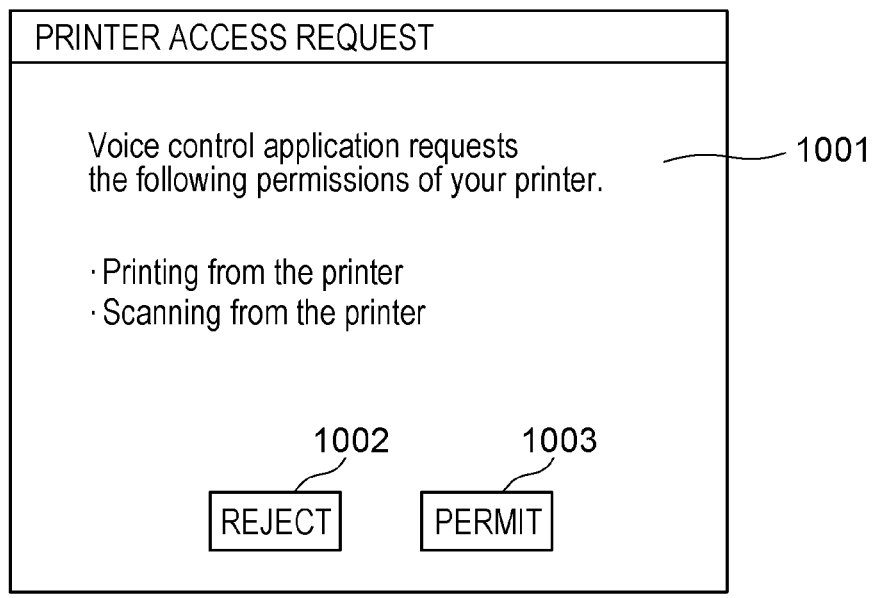
FIG. 10A and FIG. 10B illustrate examples of a permission screen.

In step S617, the terminal device 105 displays the permission screen. FIG. 10A illustrates an example of the permission screen that is displayed at this time. An area 1001 represents a function the permission of which needs to be checked. Examples of the function the permission of which needs to be checked include a function of instructing the communication device 104 to perform printing and a function of instructing the communication device 104 to perform the scan process. After permission to perform the function is granted, the management server 102 can perform the permitted function, based on the user instruction to the voice control device 101. An area 1002 is a button that is pushed in the case where the user does not grant the permission to perform the function related to the communication device 104 to the management server 102. An area 1003 is a button that is pushed in case where the user grants the permission to perform the function related to the communication device 104 to the management server 102.

In step S618, the terminal device 105 receives an operation in the area 1003. The terminal device 105 transmits information that represents the permission to perform the function related to the communication device 104 is granted to the relay server 103.

In step S619, the relay server 103 accesses the management server 102, based on the information about the management server 102 received at S615. The relay server 103 transmits an access token for permission for access by the first account and information about the second account to the management server 102.

In step S620, the management server 102 associates the first account and the second account with each other based on the received information for management.

In step S621, the management server 102 notifies the terminal device 105 of the end of the process of associating the first account and the second account with each other.

In step S622, the terminal device 105 displays a notification screen for notification of the end of the process of associating the first account and the second account with each other, based on the notification at S621. In the case where the operation in the area 1002 is received, and the permission to perform the function related to the communication device 104 is not granted, the terminal device 105 displays a screen for notification of the failure of the association between the first account and the second account.

Consequently, the management server 102 can manage the devices and the accounts that are associated with each other, and which information is to be transmitted to the devices can be recognized in the notification process according to the present embodiment.

The process that is performed by the terminal device 105 in the above description may be performed by using, for example, a Web browser of the terminal device 105 instead of the voice control application.

A process for performing the function related to the communication device 104 by using the voice instruction to the voice control device 101 will be described with reference a sequence diagram illustrated in FIG. 7. Processes in the sequence are performed by the devices in a manner in which the CPUs of the devices run programs that are stored in, for example, the ROMs of the devices. The Processes in the sequence are performed by the devices after the registration process illustrated in FIG. 6 ends.

The user gives first wake words related to the voice control device 101 with a voice near the voice control device 101. As a result, the mode of the voice control device 101 transitions to a mode in which a voice instruction is received from the user. A specific example of the first wake words is the name of the voice control device. Subsequently, the user gives second wake words with a voice as the instruction for performing the function related to the communication device 104. A specific example of the second wake words is words "start up the printer".

For this purpose, at S701, the voice control device 101 receives the voice of the user by using the microphone 204 to receive the instruction (second wake words) for performing the function related to the communication device 104.

In step S702, the voice control device 101 transmits voice data based on the voice that is received at S701 to the management server 102 via the internet. When the voice data is transmitted, the voice control device 101 may transmit the voice of the user that is received by the microphone 204 as the voice data or may convert the voice of the user into text data and may transmit the text data as the voice data.

In step S703, the management server 102 analyzes the received voice data. Specifically, the management server 102 analyzes the voice data corresponding to the second wake words and specifies the first account that is associated with the voice control device 101, the relay server 103, and the second account.

Figure 6:
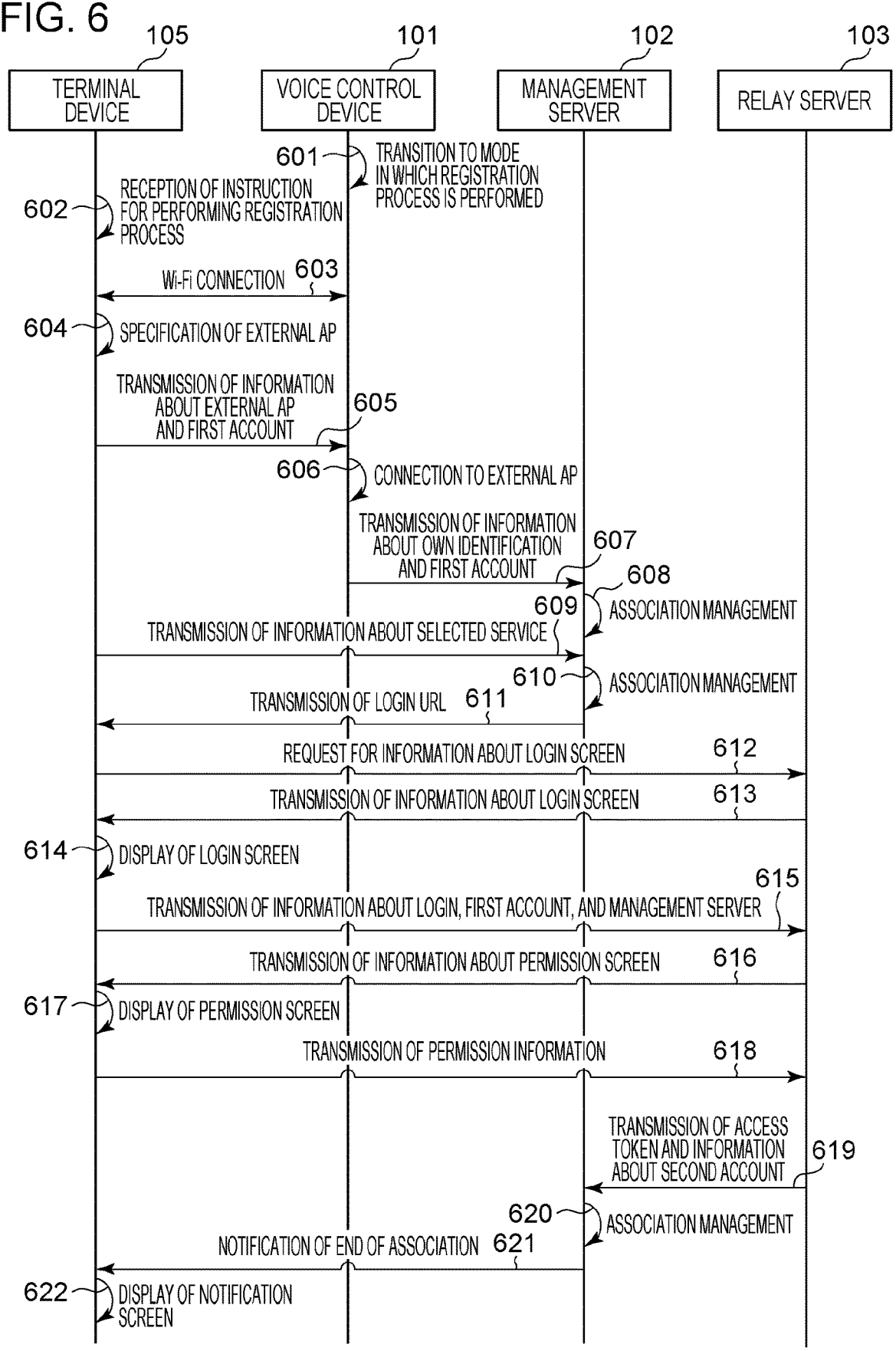
FIG. 6 is a sequence diagram illustrating a registration process.
Figure 7:
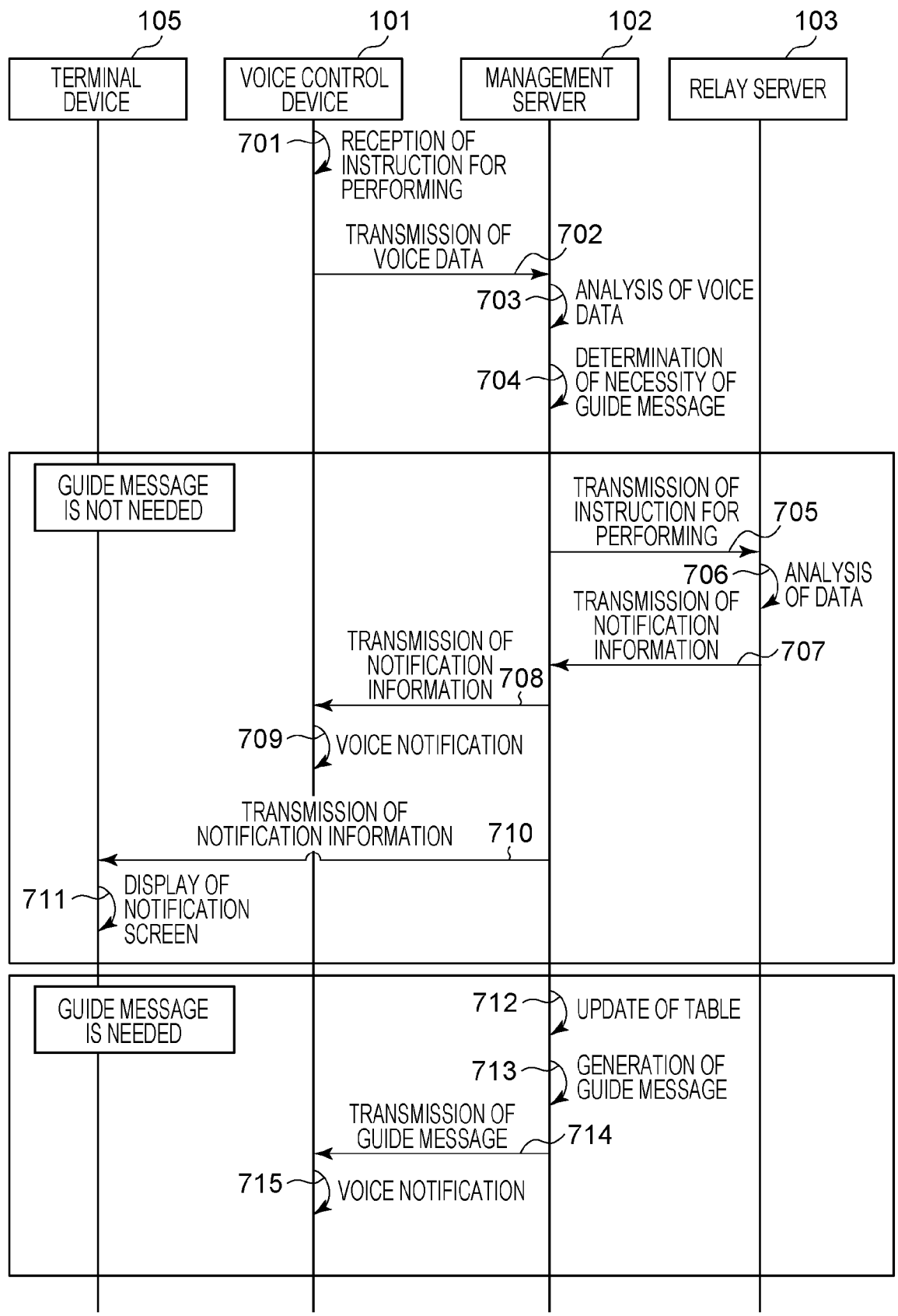
FIG. 7 is a sequence diagram illustrating a process of performing a function related to the communication device by using a voice instruction.

The management server 102 and the relay server 103 obtains the permission to perform the function related to the communication device 104 from the user in the process in FIG. 6. In some cases, however, a new function is added as a function related to the communication device 104, for example, due to the update of the communication device 104, the relay server 103, and the management server 102. According to the present embodiment, the application program of the management server 102 is updated. In the case where the update is done, it is necessary for the management server 102 to obtain permission to perform the function from the user in order to perform the added function by using the management server 102. Examples of the newly added function include a function of obtaining information about the communication device 104 for voice notification of the information by using the voice control device 101 and a function of instructing the communication device 104 to perform a maintenance process. The examples also include a function of instructing the communication device 104 to perform a copy process and a function of instructing for changing the state of the power supply of the communication device 104. The update includes a first update in which a new function is added as a function related to the communication device 104, and a second update in which it is informed that the new function is to be added as the function related to the communication device 104 in a few days (first update is to be done in a few days). In the case where the update is done, notification about the update is preferably given. Specifically, for example, in the case where after the first update is done, permission to perform a function is not granted from the user related to the first account among functions that use the communication device 104, notification for prompting the user to grant the permission is preferably given. For example, in the case where the second update is done, and the new function is to be added as the function related to the communication device 104 in a few days, notification for causing the user to recognize that the new function is to be added as the function related to the communication device 104 in a few days is preferably given.

Accordingly, at S704, the management server 102 determines whether the notification about the update is given. According to the present embodiment, the notification about the update is given by transmitting a guide message about the update. Accordingly, the determination is referred to as determination of the necessity of the guide message.

A specific method for the determination of the necessity of the guide message will be described. The management server 102 has a table illustrated in FIG. 11 in the database 313. In the table, a user ID 1101 represents accounts that use a service that is provided by the relay server 103. Date of last use 1102 represents the last date and time at which the function related to the communication device 104 is performed by each account by using the service that is provided by the relay server 103. An update code 1103 is a flag that represents whether the function related to the communication device 104 is performed by each account after the last update date by using the service that is provided by the relay server 103. The last update date indicates date on which a new function is lastly added as a function related to the communication device 104 by the most recent update. The management server 102 has information about the last update date, for example, in the database 313. For example, the management server 102 compares the date and time at which the function related to the communication device 104 is performed and the last update date and appropriately updates the update code 1103. When the update code 1103 is 1, the target account performs the function related to the communication device 104 after the last update date. In other words, no update is done after date and time at which the target account lastly (previously) performs the function related to the communication device 104. When the update code 1103 is 2, the target account does not perform the function related to the communication device 104 after the last update date. In other words, the update is done after date and time at which the target account lastly (previously) performs the function related to the communication device 104. In the case where the target account does not perform a function that uses the communication device 104 after the last update date, this means that the permission to perform a newly added function is not granted from the target account. For this reason, according to the present embodiment, the management server 102 makes determination at S704, based on the value of the update code 1103. Specifically, in the case where the update code 1103 is 1, and the first account performs the function related to the communication device 104 after the last update date, the management server 102 determines that the result of the determination at S704 is NO. In the case where the update code 1103 is 2, and the first account does not perform the function related to the communication device 104 after the last update date, the management server 102 determines that the result of the determination at S704 is YES. The detail of the determination is not limited thereto. For example, the management server 102 may have a flag that directly represents whether permission to perform all of the functions that use the communication device 104 including the function added on the last update date is granted from the target account. In the case where the permission to perform all of the functions is granted from the target account, the management server 102 may determine NO at S704. In the case where the permission to perform all of the functions is not granted from the target account, the management server 102 may determine YES at S704.

A process in the case where the result of the determination at S704 is NO will be described.

At S705, the management server 102 notifies the relay server 103 that the instruction for performing the function related to the communication device 104 is received. At this time, information to be transmitted includes the information about the second account.

In step S706, the relay server 103 specifies that the print service is requested to be performed. The second account is specified based on the information that is received at S705 and which function related to the communication device 104 is to be performed is specified.

In step S707, notification information for notification of a function list related to the communication device 104 is transmitted to the management server 102. According to the present embodiment, notification is given by both of the voice control device 101 and the terminal device 105, and the relay server 103 transmits notification information for the voice control device 101 and notification information for the terminal device 105. According to the present embodiment, the content of a message in voice notification by the voice control device 101 is determined depending on the notification information for the voice control device 101. That is, the relay server 103 controls the contents of the message in the voice notification by the voice control device 101. Similarly, the contents of a figure and a message in screen notification by the terminal device 105 are determined depending on the notification information for the terminal device 105. That is, the relay server 103 controls the contents of the figure and the message in the screen notification by the terminal device 105.

In step S708, the management server 102 transmits voice notification information for the voice notification of the function list related to the communication device 104 to the voice control device 101, based on the received notification information.

In step S709, the voice control device 101 gives voice notification of the list of the functions that uses the communication device 104 using the speaker 201, based on the received voice notification information. An example of the function related to the communication device 104 is described above. At this time, notification of some of the functions that use the communication device 104 may be given instead of the list of the functions that use the communication device 104. For example, notification of the detail of a function that uses the communication device 104 may be given. For example, in the case where the function that uses the communication device 104 is a function of causing the communication device 104 to perform printing, notification of a content (such as news, an arithmetic question, or a puzzle) printed by the function may be given.

In step S710, the management server 102 transmits screen notification information for screen display notification of the function related to the communication device 104 to the terminal device 105 associated with the first account, based on the received notification information. The process at S710 may be performed before the process at S708.

Figure 14A:
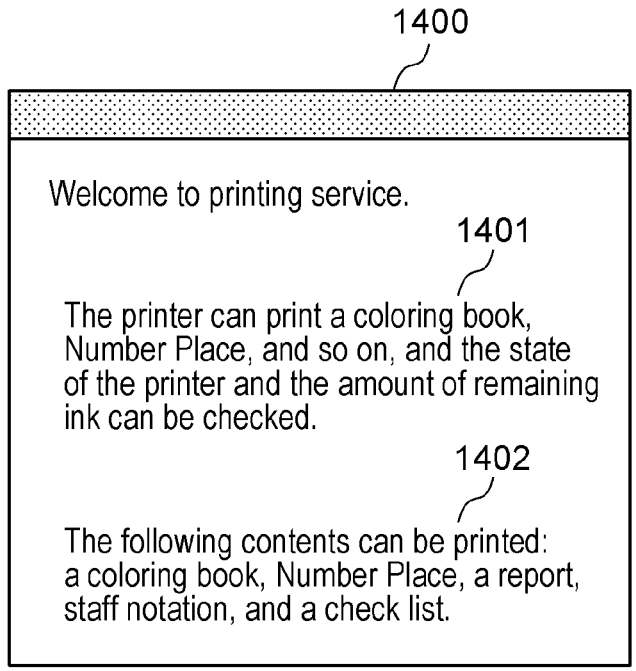
FIG. 14A and FIG. 14B illustrate examples of a notification screen.

In step S711, the terminal device 105 causes the display unit 504 to display a notification screen for notification of the function related to the communication device 104, based on the received screen notification information. Specifically, for example, a notification screen 1400 illustrated in FIG. 14A is displayed. According to the present embodiment, the terminal device 105 notifies the user of a more detailed content than the content of the voice notification by the voice control device 101 by using the notification screen. The notification screen 1400 includes an area 1401 for the notification of the function related to the communication device 104 and an area 1402 for the notification of the kinds of contents that can be printed by the print function. At S709, the content of the voice notification and the content of the screen notification at S711 may differ from each other. Specifically, notification of a message in the area 1401, for example, is given also by the voice notification at S709, but notification of a message in the area 1402 may not be given by the voice notification at S709. The notification screen may include not only a message for notification of the information about the communication device 104 such as the messages that are displayed in the area 1401 and the area 1402, but also a figure for the notification of the information about the communication device 104.

This enables the user to grasp the function related to the communication device 104 and to instruct to perform the function related to the communication device 104.

A process in the case where the result of the determination at S704 is YES will be described.

Figure 11:
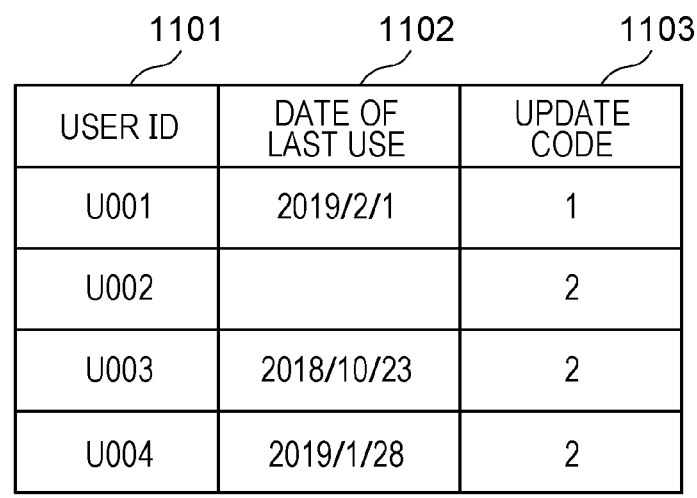
FIG. 11 illustrates a table that is used for determination of the necessity of a guide message.

At S712, the management server 102 updates information about the table illustrated in FIG. 11. Specifically, the management server 102 updates the update code 1103 related to the first account from 2 to 1.

In step S713, the management server 102 generates a guide message. A method of generating the guide message will be described in detail later. According to the present embodiment, notification including the guide message is given only by the voice notification by the voice control device 101 but is not limited thereto. The notification including the guide message may be given also by the screen notification by the terminal device 105. In this case, the management server 102 generates a guide message for the voice control device 101 and a guide message for the terminal device 105. The guide message for the terminal device 105 is transmitted to the terminal device 105 that is associated with the first account, and the terminal device 105 displays a notification screen including the content of the guide message. For example, only the screen notification by the terminal device 105 may be given without the voice notification by the voice control device 101.

In step S714, the management server 102 transmits the guide message for the voice control device 101 to the voice control device 101.

In step S715, the voice control device 101 gives voice notification of the content of the guide message that is received at S714 by using the speaker 201.

Figure 10B:
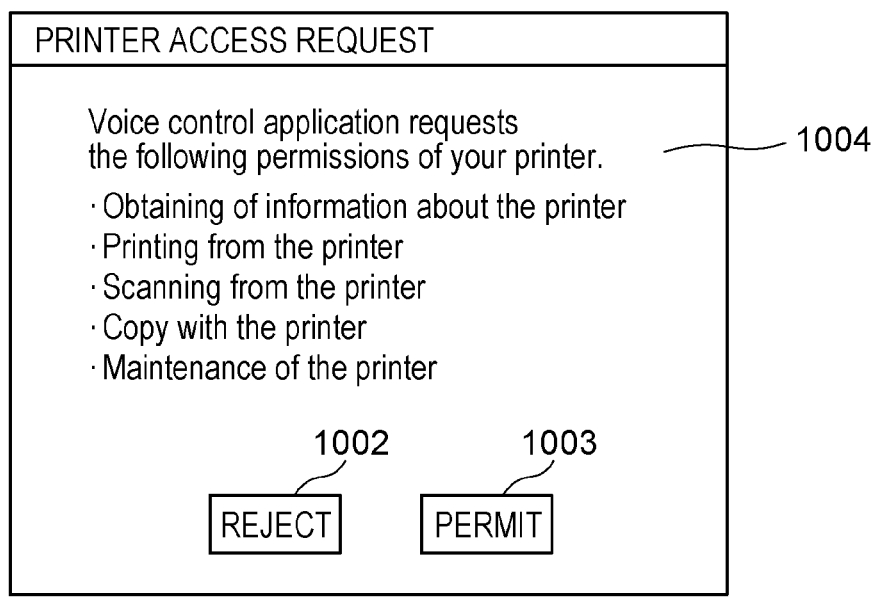

The notification including the content of the guide message prompts the user to grant permission to perform the added function due to the update. However, the permission to perform the added function due to the update is granted when the account link process is performed again after S609. Accordingly, for example, the guide message may prompt the user to perform the account link process. FIG. 10B illustrates an example of a permission screen displayed in the case where the function permission of which needs to be checked is added due to the update. In an area 1004, the added function due to the update is displayed in addition to the functions displayed before the update. In the case where an operation in the area 1003 of the permission screen is received, permission to perform all of the currently active functions including the added function due to the update is granted.

According to the present embodiment as described later, the management server 102 can perform a function that has the permission even when there is a function that does not have the permission due to the update. Accordingly, the devices may perform a process in the case where the result of the determination at S704 is NO in a process in the case where the result of the determination at S704 is YES.

Figure 12:
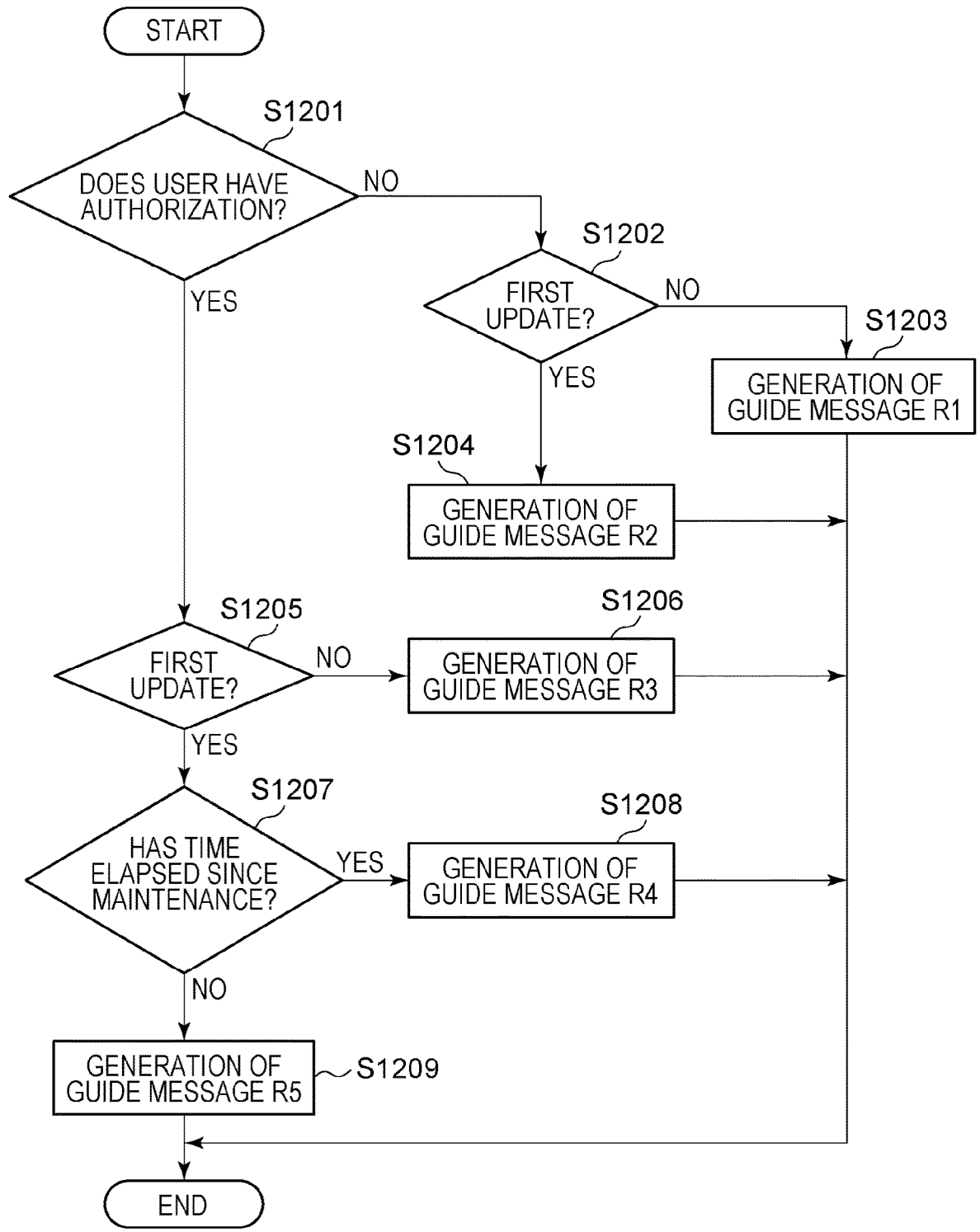
FIG. 12 is a flow chart illustrating a method of generating the guide message in detail.

The method of generating the guide message at S713 will be described in detail with reference to a flow chart in FIG. 12. Processes in the flow chart in FIG. 12 are performed in a manner in which the CPU 301 of the management server 102 loads a program that is stored in, for example, the disk device 302 into, for example, the memory 304 and runs the program.

At S1201, the CPU 301 determines whether the user who inputs the voice instruction for performing into the voice control device 101 at S701 has management authorization of the communication device 104. The management server 102 recognizes the characteristics of the voice of the user who has the management authorization of the communication device 104 in advance. The CPU 301 compares the voice recognized in advance and the voice that is inputted at S701 for the determination. If the result of the determination is YES, the CPU 301 performs a process at S1205. If the result of the determination is NO, a process at S1202 is performed.

The process in the case where the result of the determination at S1201 is NO will be described.

At S1202, the CPU 301 determines whether the first update is included in updates after the latest date and time at which the function related to the communication device 104 is performed. The case where the result of the determination is NO means the case where all of the updates after the latest date and time at which the function related to the communication device 104 is performed are the second updates. If the result of the determination is YES, the CPU 301 performs a process at S1204. If the result of the determination is NO, a process at S1203 is performed.

At S1203, the CPU 301 generates a guide message (notification message) R1 for notifying the user of the first account that the function is to be added. The guide message R1 is also used to prompt the user of the first account to request the user who has the management authorization of the communication device 104 to grant the permission to perform the function in the case where the function is added. The management server 102 has a table that represents the contents of the guide message illustrated in FIG. 13 in the database 313. In the table, a message ID 1301 represents an ID related to the guide message. A guide message 1302 represents a notification content of the guide message. The CPU 301 refers the table illustrated in FIG. 13 and generates the guide message R1. The guide message R1 may be used to prompt the user of the first account to request the user who has the management authorization of the communication device 104 to perform the account link process in the case where the function is to be added. The guide message R1 may be used for notification of date and time at which the function is to be added (that is, the update is to be done). Subsequently, the CPU 301 ends the processes in the flow chart and performs the process at S714.

At S1204, the CPU 301 generates a guide message R2 for notifying the user of the first account to request the user who has the management authorization of the communication device 104 to grant permission to perform the added function due to the update. This process is performed by referring the table illustrated in FIG. 13. The guide message R2 may be used to prompt the user of the first account to request the user who has the management authorization of the communication device 104 to perform the account link process. Subsequently, the CPU 301 ends the processes in the flow chart and performs the process at S714.

The process in the case where the result of the determination at S1201 is YES will be described.

At S1205, the CPU 301 determines whether the first update is included in the updates after the latest date and time at which the function related to the communication device 104 is performed. If the result of the determination is YES, the CPU 301 performs a process at S1207. If the result of the determination is NO, a process at S1206 is performed.

At S1206, the CPU 301 generates a guide message R3 that is used to notify the user of the first account that the function is to be added or to prompt the user of the first account to grant permission to perform the function in the case where the function is added. Also, this process is performed by referring the table illustrated in FIG. 13. The guide message R3 may be used to prompt the user of the first account to perform the account link process in the case where the function is to be added. The guide message R3 may be used for notification of date and time at which the function is to be added (that is, the update is to be done). Subsequently, the CPU 301 ends the processes in the flow chart and performs the process at S714.

At S1207, the CPU 301 determines whether a predetermined time has elapsed since the last maintenance of the communication device 104. If the result of the determination is YES, the CPU 301 performs a process at S1208. If the result of the determination is NO, a process at S1209 is performed. The determination is made in the case where a new function of instructing the communication device 104 to perform the maintenance process due to the first update.

At S1208, the CPU 301 generates a guide message R4 for notifying the user of the first account that the new function of instructing the communication device 104 to perform the maintenance process is added. The guide message R4 is also used to prompt the user of the first account to grant permission to perform the newly added function. Also, this process is performed by referring the table illustrated in FIG. 13. The guide message R4 may be used to prompt the user of the first account to perform the account link process. Subsequently, the CPU 301 ends the processes in the flow chart and performs the process at S714.

At S1209, the CPU 301 generates a guide message R5 for notifying the user of the first account that the new function related to the communication device 104 is added or to prompt the user of the first account to grant permission to perform the newly added function. Also, this process is performed by referring the table illustrated in FIG. 13. The guide message R5 may not include information about the detail of the newly added function. The guide message R5 may be used to prompt the user of the first account to perform the account link process. Subsequently, the CPU 301 ends the processes in the flow chart and performs the process at S714.

The above embodiment enables the guide message suitable for an update content or the state of the communication device 104 to be generated.

The contents of the guide message may not change depending on the update content or the state of the communication device 104 as above. For example, the contents may depend on neither the update content nor the state of the communication device 104, and the same guide message (for example, the guide message R5) may be generated. Regarding the specification of the guide message to be generated, not all of the above determinations (S1201, S1202, S1205, and 1207) may be made.

Figure 8:
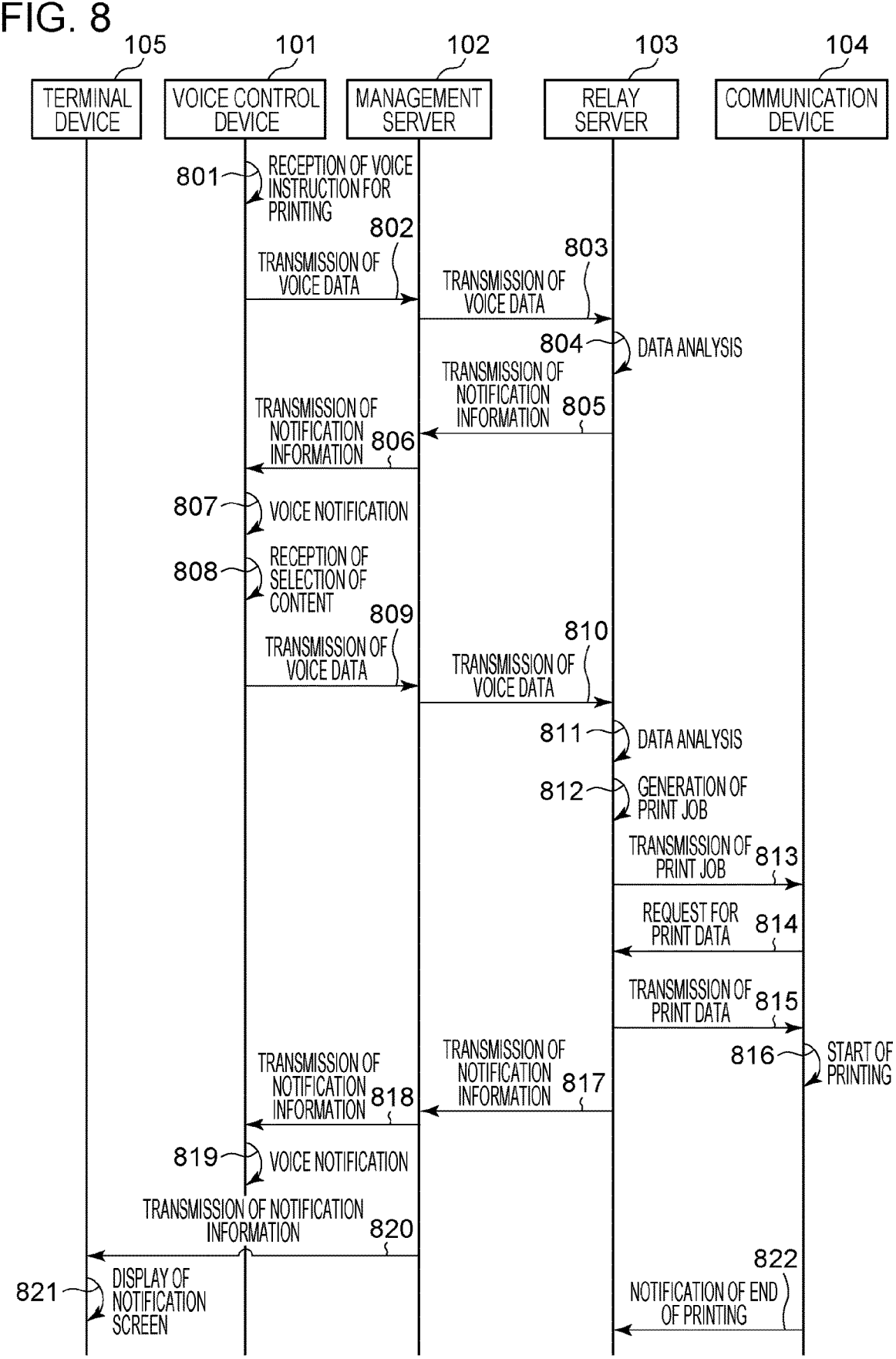
FIG. 8 is a sequence diagram of a print process that uses the voice control device.

The print process that uses the voice control device 101 will now be described. FIG. 8 illustrates a sequence diagram of the print process that uses the voice control device 101. Processes in the sequence are performed by the devices in a manner in which the CPUs of the devices run programs that are stored in, for example, the ROMs of the devices. The processes in the sequence are performed by the devices after the processes described with reference to FIG. 7 end. According to the present embodiment, the association between the first account and the second account is maintained even in the case where the new function that uses the communication device 104 is added due to the update. Accordingly, the communication system can perform the function that has the permission, for example, even in a state where the result of the determination at S704 is YES in the process in FIG. 7, and permission to perform the newly added function is not granted. That is, the communication system can perform a process described below even in a state where the permission to perform the newly added function is not granted, provided that the permission to perform the print function is granted from the user.

The user gives third wake words related to the print function with a voice as a print instruction to use the print function related to the communication device 104.

For this purpose, at S801, the voice control device 101 receives the voice of the user by using the microphone 204 to receive the print instruction (third wake words).

In step S802, the voice control device 101 transmits voice data based on the voice that is received at S801 to the management server 102 via the internet.

In step S803, the management server 102 transmits information based on the received voice data to the relay server 103.

In step S804, the relay server 103 analyzes the information that is received at S803 to specify that the print function is requested to be performed.

In step S805, the relay server 103 transmits, to the management server 102, the notification information for the voice control device 101 that is used for voice notification of the kinds of the contents that can be printed by the print function. According to the present embodiment, the notification of the kinds of the contents that can be printed by the print function is given only by the voice notification by the voice control device 101 but may be given by the screen notification by the terminal device 105. That is, the relay server 103 may transmit the notification information for the terminal device 105 that is used for screen display notification of the kinds of the contents that can be printed by the print function.

In step S806, the management server 102 transmits voice notification information for the voice notification of the kinds of the contents that can be printed by the print function to the voice control device 101, based on the received notification information.

In step S807, the voice control device 101 gives the voice notification of the kinds of the contents that can be printed by the print function using the speaker 201, based on the received voice notification information.

Accordingly, the user grasps the kinds of the contents that can be printed by the print function and calls the name of a content to select the content that is to be printed by the print function. At this time, the user may give words of print settings (such as the number of copies to be printed and color settings for printing) for printing of the content with a voice.

For this purpose, at S808, the voice control device 101 receives the voice of the user by using the microphone 204 to receive the result of the selection of the content to be printed by the print function or the print settings.

In step S809, the voice control device 101 transmits voice data based on the voice that is received at S808 to the management server 102 via the internet.

In step S810, the management server 102 transmits information based on the received voice data to the relay server 103.

In step S811, the relay server 103 analyzes the information that is received at S810 and specifies the content to be printed by the print function.

At S812, print data in binary format is generated to print the content to be printed, and a print job is generated to cause the communication device 104 that is associated with the second account to print the content to be printed. The generated print data is saved in a predetermined storage area of the relay server 103. The generated print job includes information (such as a URL) for obtaining the print data saved in the predetermined storage area of the relay server 103.

At S813, the relay server 103 transmits the generated print job to the communication device 104 associated with the second account via the internet.

At S814, the communication device 104 transmits a request for obtaining the print data saved in the predetermined storage area of the relay server 103 to the relay server 103, based on the received print job.

At S815, the relay server 103 transmits the print data generated at S812 to the communication device 104 in response to the request received at S814. The relay server 103 may not separately transmit the print job and the print data to the communication device 104 but may transmit the print job including the print data at S813.

At S816, the communication device 104 starts printing based on the received print job and print data. When an error occurs during printing, the communication device 104 transmits state information that represents the communication device 104 has the error to the relay server 103.

At S817, the relay server 103 transmits, to the management server 102, notification information for notification that the selected content is printed by the communication device 104 when the communication device 104 starts printing. According to the present embodiment, notification is given by both of the voice control device 101 and the terminal device 105, and the relay server 103 transmits the notification information for the voice control device 101 and the notification information for the terminal device 105.

At S818, the management server 102 transmits, to the voice control device 101, voice notification information for voice notification that the selected content is printed by the communication device 104, based on the received notification information.

At S819, the voice control device 101 gives voice notification that the selected content is printed by the communication device 104 by using the speaker 201, based on the received voice notification information.

At S820, the management server 102 transmits, to the terminal device 105 that is associated with the first account, screen notification information for screen display notification that the selected content is printed by the communication device 104, based on the received notification information. The process at S820 may be performed before the process at S818.

At S821, the terminal device 105 causes the display unit 504 to display a notification screen for the notification that the selected content is printed by the communication device 104, based on the received screen notification information.

Figure 14B:
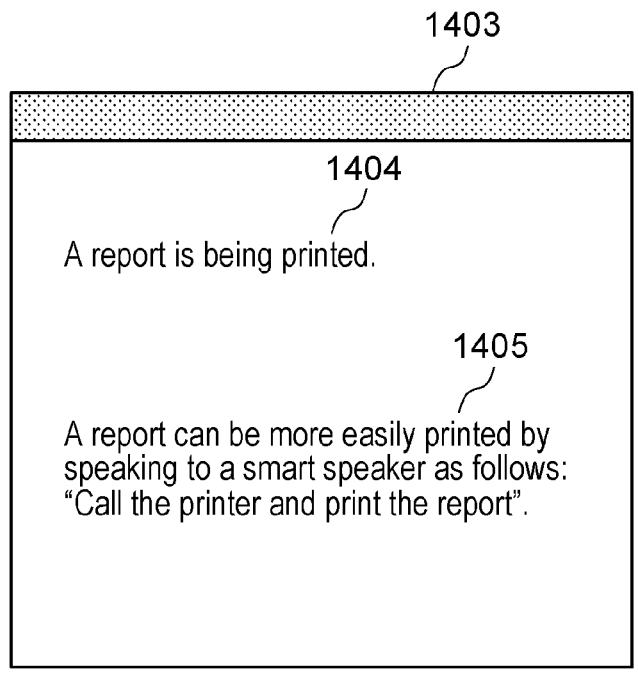

Specifically, for example, a notification screen 1403 illustrated in FIG. 14B is displayed. According to the present embodiment, the terminal device 105 notifies the user of a more detailed content than the content of the voice notification by the voice control device 101 by using the notification screen. The notification screen 1403 includes an area 1404 for the notification that the selected content is printed by the communication device 104 and an area 1405 for notification of wake words that are used to perform the print instruction and that differ from the third wake words. According to the present embodiment, notification of a message in the area 1404 is given also by the voice notification at S819. However, notification of a message in the area 1405 is not given by the voice notification at S819 but is given only by the screen notification at S821.

At S822, the communication device 104 transmits printing-end-state information that represents the end of printing to the relay server 103 when printing based on the print job ends.

In this way, the communication device 104 can perform printing in a manner in which the print instruction to the voice control device 101 with a voice acts as a trigger.

After S822, the relay server 103 may transmit notification information for notification of the end of printing to the voice control device 101 or the terminal device 105, based on the printing-end-state information.

According to the above embodiment, the user can control the communication device 104 by using the voice instruction to the voice control device 101.

Other Embodiments

Embodiment(s) can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While exemplary embodiments have been described, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2019-124619, filed Jul. 3, 2019, which is hereby incorporated by reference herein in its entirety.

What is claimed is:

1. A communication system including a communication device and a server system, the communication system comprising:
    a first obtaining unit that obtains permission to perform a first function related to the communication device using the server system from a user;
    a first performing unit that performs the first function based on an instruction for performing the first function is inputted to a voice control device with a voice, after obtaining permission to perform the first function related to the communication device,
    a second performing unit that performs a predetermined notification process for prompting the user to perform a process for permitting to perform a second function performed by the server system, in a case where the second function, that the user does not permit the server system to perform and that is different from the first function, is added as the function related to the communication device;
    a second obtaining unit that obtains permission to the second function performed by using the server system from the user,
    a third performing unit that performs the first function using the server system, in a case where an instruction for performing the first function is inputted into a voice control device with a voice, after the predetermined notification process is performed and in a state where the permission to perform the second function by using the server system is not obtained from the user and in a state where the permission to perform the first function by using the server system is obtained from the user in advance; and
    a fourth performing unit that performs a process corresponding to the first function by the communication device in a case where the first function is performed by using the server system.

2. The communication system according to claim 1, wherein the predetermined process is a process for causing the voice control device to notify, by voice, a message for obtaining, from the user, permission for performing the second function by using the server system.

3. The communication system according to claim 2, wherein the message is used to prompt the user to perform a process for granting permission to perform the function related to the communication device using the server system.

4. The communication system according to claim 2, wherein the predetermined process is performed based on a voice is inputted into the voice control device, and
    wherein, in a case where the user who inputs the voice into the voice control device has no authorization to grant permission to perform the function related to the communication device by using the server system, the message is used to obtain the permission to perform the predetermined function by using the server system from a user who has the authorization to grant the permission to perform the function related to the communication device using the server system.

5. The communication system according to claim 2, wherein a content of the message changes based on a content of the second function that is added as the function related to the communication device.

6. The communication system according to claim 2, wherein, in a case where a predetermined time has elapsed since latest time at which a process related to a function of the second functions that are added as the functions related to the communication device is performed by the communication device, the message includes a message that represents the function of the predetermined functions is added as the function of the communication device.

7. The communication system according to claim 1, further comprising:
    a notification unit that performs a specific process for notification that the second function is to be added as the function related to the communication device, in a case where it is specified that the second function is to be added as the function related to the communication device.

8. The communication system according to claim 7, wherein the specific process is a process for causing the voice control device to give voice notification of a notification message that represents the second function is to be added as the function related to the communication device.

9. The communication system according to claim 8, wherein the notification message includes a message related to date and time at which the second function is to be added as the function related to the communication device.

10. The communication system according to claim 1, wherein the predetermined process is a process of causing a terminal device to display a notification screen for obtaining the permission to perform the second function by using the server system from the user.

11. The communication system according to claim 1, wherein a terminal device displays a first permission screen for obtaining the permission to perform the first function by using the server system, and
    wherein, in a case where the permission to perform the function related to the communication device by using the server system is inputted into the terminal device using the first permission screen, the permission to perform the function related to the communication device by the server system is obtained,
    wherein, the terminal device displays a second permission screen, that is different from the first permission screen, for obtaining permission to perform the second function by using the server system, and
    wherein, in a case where the permission to the function related to the communication device by using the server system is inputted to the terminal device using the second permission screen, the permission to perform the second function by the server system is obtained.

12. The communication system according to claim 1, wherein the function related to the communication device includes a function of causing the communication device to perform a process that can be performed by the communication device, a function of obtaining information about a state of the communication device, or both.

13. The communication system according to claim 1, wherein a process that can be performed by the communication device includes a print process, a scan process, a copy process, a maintenance process, or all of the processes.

14. The communication system according to claim 1,
wherein the predetermined function is added as the function related to the communication device by updating a predetermined application program in the server system.

15. The communication system according to claim 1,
wherein the server system includes one or more information-processing apparatuses.

16. A method of controlling a communication system that includes a communication device and a server system, the method comprising:

obtaining permission to perform a first function related to the communication device by using the server system from a user;

performing the first function based on an instruction for performing the first function is inputted to a voice control device with a voice, after obtaining permission to perform the first function related to the communication device, performing a predetermined notification process for prompting the user to perform a process for permitting to perform a second function performed by the server system, in a case where the second function, that the user does not permit the server system to perform and that is different from the first function, is added as the function related to the communication device;

obtaining permission to the second function performed by using the server system from the user, performing the first function using the server system, in a case where an instruction for performing the first function is inputted into a voice control device with a voice, after the predetermined notification process is performed and in a state where the permission to perform the second function by using the server system is not obtained from the user and in a state where the permission to perform the first function by using the server system is obtained from the user in advance; and performing a process corresponding to the first function by the communication device in a case where the first function is performed by using the server system.

17. A non-transitory computer-readable storage medium storing a program for causing a computer of a server system to perform a process of:

obtaining permission to perform a first function related to a communication device by using the server system from a user;

performing the first function based on an instruction for performing the first function is inputted to a voice control device with a voice, after obtaining permission to perform the first function related to the communication device, a predetermined notification process for prompting the user to perform a process for permitting to perform a second function performed by the server system, in a case where the second function, that the user does not permit the server system to perform and that is different from the first function, is added as the function related to the communication device;

obtaining permission to the second function performed by using the server system from the user, performing the first function using the server system, in a case where an instruction for performing the first function is inputted into a voice control device with a voice, after the predetermined notification process is performed and in a state where the permission to perform the second function by using the server system is not obtained from the user and in a state where the permission to perform the first function by using the server system is obtained from the user in advance; and performing a process corresponding to the first function by the communication device in a case where the first function is performed by using the server system.

\* \* \* \* \*